(12) United States Patent
Yao et al.

(10) Patent No.: US 7,600,000 B2
(45) Date of Patent: Oct. 6, 2009

(54) ULTRA WIDEBAND WIRELESS STORAGE DEVICE

(75) Inventors: Richard Yuqi Yao, Bellevue, WA (US);
Steven O. Elliott, Renton, WA (US);
Ya-Qin Zhang, Bellevue, WA (US)

(73) Assignee: Microsoft corporation, Redmond, WA (US)

( * ) Notice: Subject to any disclaimer, the term of this patent is extended or adjusted under 35 U.S.C. 154(b) by 639 days.

(21) Appl. No.: 11/218,871

(22) Filed: Sep. 2, 2005

(65) Prior Publication Data
US 2007/0055790 A1 Mar. 8, 2007

(51) Int. Cl.
*G06F 15/16* (2006.01)
(52) U.S. Cl. .................. 709/217; 709/219; 709/246
(58) Field of Classification Search .................. 709/238, 709/246, 248, 249, 250, 389, 217, 218, 219
See application file for complete search history.

(56) References Cited

U.S. PATENT DOCUMENTS 7,363,343 B2 * 4/2008 Bucher ....................... 709/205

2005/0027890 A1 * 2/2005 Nelson et al. ............... 709/250

* cited by examiner

*Primary Examiner*—Joseph E. Avelino
*Assistant Examiner*—Harunur Rashid
(74) *Attorney, Agent, or Firm*—Merchant & Gould, P.C.

(57) ABSTRACT

A portable ultra wideband device wirelessly connects to personal computers and other computing or consumer devices with an ultra-high speed link. The ultra wideband device provides data storage and retrieval functionalities. Data or information is formatted for ultra wideband wireless transmission at a transmitting device. The data is transmitted from an ultra wideband communication interface of the transmitting device over a wireless medium to the receiving device. The data transmission is transparent to the receiving device. An ultra wideband communication interface on the receiving device processes the data according to an ultra wideband protocol. The original data is parsed from the file and translated into its original format which is supported by an application on the receiving device. The original data is used to execute a read/write action on a storage device of the receiving device such that the translated data is automatically available to the receiving device.

18 Claims, 6 Drawing Sheets

ULTRA WIDEBAND WIRELESS STORAGE DEVICE

BACKGROUND

Most computer and consumer electronic devices require wires to record, play or exchange data. Ultra wideband (UWB) technology brings the convenience and mobility of wireless communications to high-speed interconnects in devices throughout the digital home and office. Designed for short-range, wireless personal area networks, ultra wideband is the leading technology for enabling high-speed wireless connection of multiple devices for transmission of video, audio and other high-bandwidth data. Ultra wideband, short-range radio technology, complements other frequency range radio technologies such as Wi-Fi, WiMAX, and cellular wide area communications. Ultra wideband technology relays data from a host device to other devices in the immediate area (e.g., up to 10 meters).

In general, an ultra wideband system is defined as any radio technology having a spectrum that occupies a bandwidth greater than 20 percent of the center frequency, or a bandwidth of at least 500 MHz. Therefore, the implementation of an ultra wideband system can be achieved by using a pulse-based technique or a multi-band orthogonal frequency division multiplexing (OFDM) based technique. In the pulsed ultra wideband system, pulses with an extremely short duration burst of radio frequency energy are transmitted and received. Specifically, each pulse is typically a few tens of picoseconds to a few nanoseconds in duration. These bursts represent from one to only a few cycles of a radio frequency carrier wave. As bandwidth is inversely related to pulse duration, the spectral extent of ultra wideband waveforms can be made quite large. In a multi-band OFDM system, the ultra wideband spectrum is divided into multiple sub-bands while information is transmitted through OFDM in different frequency sub-bands by using an inverse fast Fourier transfer (IFFT). Because of the wide bandwidth, the allowable transmission power in an ultra wideband system is very low thereby avoiding interference with other narrow band systems.

The ultra-wide bandwidth and low transmission power characteristics make ultra wideband technology attractive for high data rate, short range wireless communications, i.e., wireless personal area networks (WPAN). Currently, an ultra wideband transmitter transmits data at speeds between 100 megabits per second to 1 gigabit per second, which is significantly faster than the most common networking technologies now in use. For example, Wi-Fi communication transmits data at 54 megabits per second, and Bluetooth technology has a data transmission rate of only 1 megabit per second. The high data transmission speeds afforded by UWB technology may therefore be suitable for handling all the PC, consumer electronic (CE), Smartphone® (as manufactured by the Microsoft Corporation of Redmond, Wash.), and Internet traffic for any home or business.

SUMMARY

Ultra wideband technology provides high speed wireless data transmission at low power consumption. These characteristics facilitate efficient wireless communication between computing devices (e.g., an ultra wideband device and a host device). Several different scenarios may be enabled by ultra wideband wireless data transmission. For example, automatic data synchronization between computing devices is achieved without requiring any user interaction. Data on one computing device may be directly accessed from a different computing device. A disaggregated computing device is decoupled from other computing components but data may be wirelessly transferred between the disaggregated computing device and the other computing components such that the data transfer is automatic and transparent.

A portable ultra wideband device with an ultra wideband communication interface wirelessly connects to a host device to transfer data over an ultra high-speed link. An application on one device initiates transmission of a file to the other device (e.g., from the host device to the ultra wideband device, from the ultra wideband device to the host device, from the ultra wideband device to a consumer electronic device, or from the consumer electronic device to the ultra wideband device). The file to be transmitted is retrieved from a storage device on the device that initiates transmission. The file is formatted into ultra wideband network communication protocol. The formatted data is then transmitted from an ultra wideband communication interface over a wireless medium to the other devices.

The file is received at an ultra wideband communication interface on the receiving device. The ultra wideband communication interface processes the data according to an ultra wideband protocol. The processing may include decompressing, decrypting, and authenticating the file. The processing may also confirm the data integrity of the file and scan the file for viruses. The original data is parsed from the file and translated into its original format which is supported by an application on the receiving device. The original data is then used to execute read/write actions on a storage device of the receiving device.

Other aspects of the invention include system and computer-readable media for performing these methods. The above summary of the present disclosure is not intended to describe every implementation of the present disclosure. The figures and the detailed description that follow more particularly exemplify these implementations.

DETAILED DESCRIPTION

The present disclosure is directed to a portable ultra wideband device with an ultra wideband communication interface that wirelessly connects to personal computers and other computing devices with an ultra high-speed link. The ultra wideband device provides data or information storage and retrieval functionalities. The hardware architecture of the ultra wideband device includes a communication interface.

The communication interface is arranged to process data for transmission/reception over an ultra wideband wireless connection.

The ultra wideband device may be used to synchronize data between computing devices. For example, a user may have a personal computer at home and an office computer. The ultra wideband device may be configured to automatically recognize the office computer and begin to check for file updates when the ultra wideband device is positioned near the personal computer within a predetermined range. The most current files may be synchronized to the office computer in a few seconds. When the user accesses the office computer, the synchronized files are immediately available without any further user action.

The user may have two or more personal computers in the office. In this example, the ultra wideband device simultaneously synchronizes the user's personal files to all of the personal computers within range. Thereafter, the files in the ultra wideband device may be periodically synchronized with the personal computers. When the user returns home, the ultra wideband device updates the files on the home computer. The ultra wideband device maintains a unified collection of personal files without having to connect the ultra wideband device to a computer, check file updates, and copy the file each time modifications are made.

The ultra wideband device may also be used with a public computing device. For example, a user may place the ultra wideband device near a public personal computer (e.g., at an airport or in a coffee shop) equipped with an ultra wideband network interface card. The public terminal recognizes the ultra wideband device as a local storage device and allows the user to access data from the ultra wideband device with the public terminal. For example, the user may access video files on the ultra wideband device to view a film on the public terminal. The ultra wideband device may have an additional operating system installed on a built-in hard disk. Thus, the user may boot the public terminal with the operating system installed on the ultra wideband device. Alternatively, registration or dynamic link library information stored in the ultra wideband device can enable auto-registrations on the public terminal such that software installed on the ultra wideband device may be used. Thus, the user can use the public terminal with the familiar configuration of their own personal computer.

The ultra wideband device may also be used as a component of a disaggregated personal computer. A disaggregated personal computer includes different computing components that are not directly integrated with each other. For example, the ultra wideband device may be wirelessly linked to a monitor (e.g., a liquid crystal display) that is not coupled to any other computing components. The ultra wideband device may boot the monitor even though the monitor is not powered by a separate central processing unit. A central processing unit in the ultra wideband device provides the power necessary to activate the monitor.

The high speed data transfer rate enables the ultra wideband device to transfer raw video data to the monitor without compression. For example, the monitor may have a dimension of 1200×720 pixels which requires a data rate of at least 800 megabits per second to achieve an acceptable viewing experience. Bluetooth and Wi-Fi technologies cannot achieve this data rate without compressing the video data. The ultra wideband device can transfer the data at a high rate without compression. Thus, power consumption for the ultra wideband device is conserved.

The ultra wideband device may also be used for storing information when storage capabilities of other computing devices approach maximum capacity. For example, the internal memory of a digital camera may reach capacity after capturing several images. The user may transfer the image files to the ultra wideband device by placing the ultra wideband device near the camera. With optional software and hardware modules, the ultra wideband device can provide additional features such as MP3 player capabilities.

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
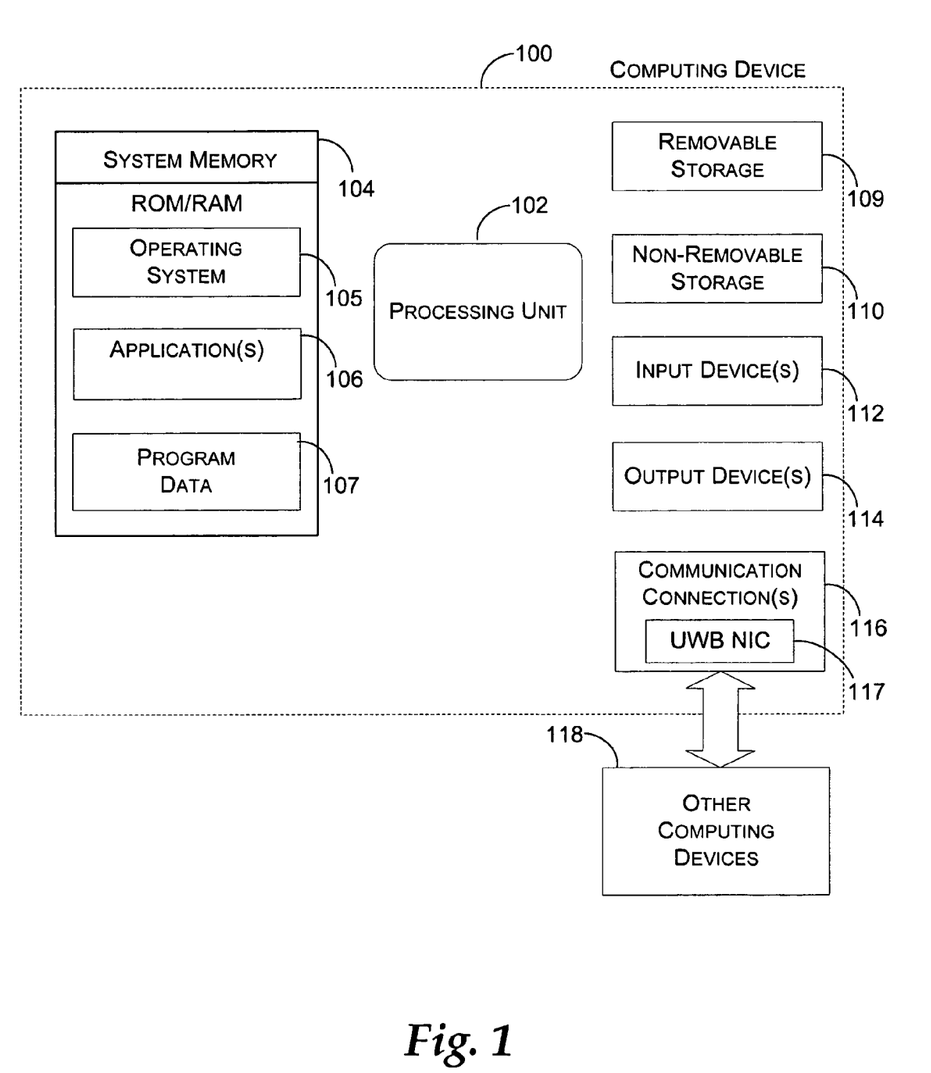
FIG. 1 is a functional diagram illustrating a computing environment and a basic computing device that can operate with an ultra wideband device.

FIG. 1 is a functional diagram illustrating a computing environment and a basic computing device, such as computing device 100, that can operate with an ultra wideband device. Computing device 100 may be configured as a client, a server, a mobile device, or any other computing or consumer electronic device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118. For example, communication connections 116 include ultra wideband network interface card 117 which enables ultra wideband wireless communication with other computing devices 1118. Communication may occur over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
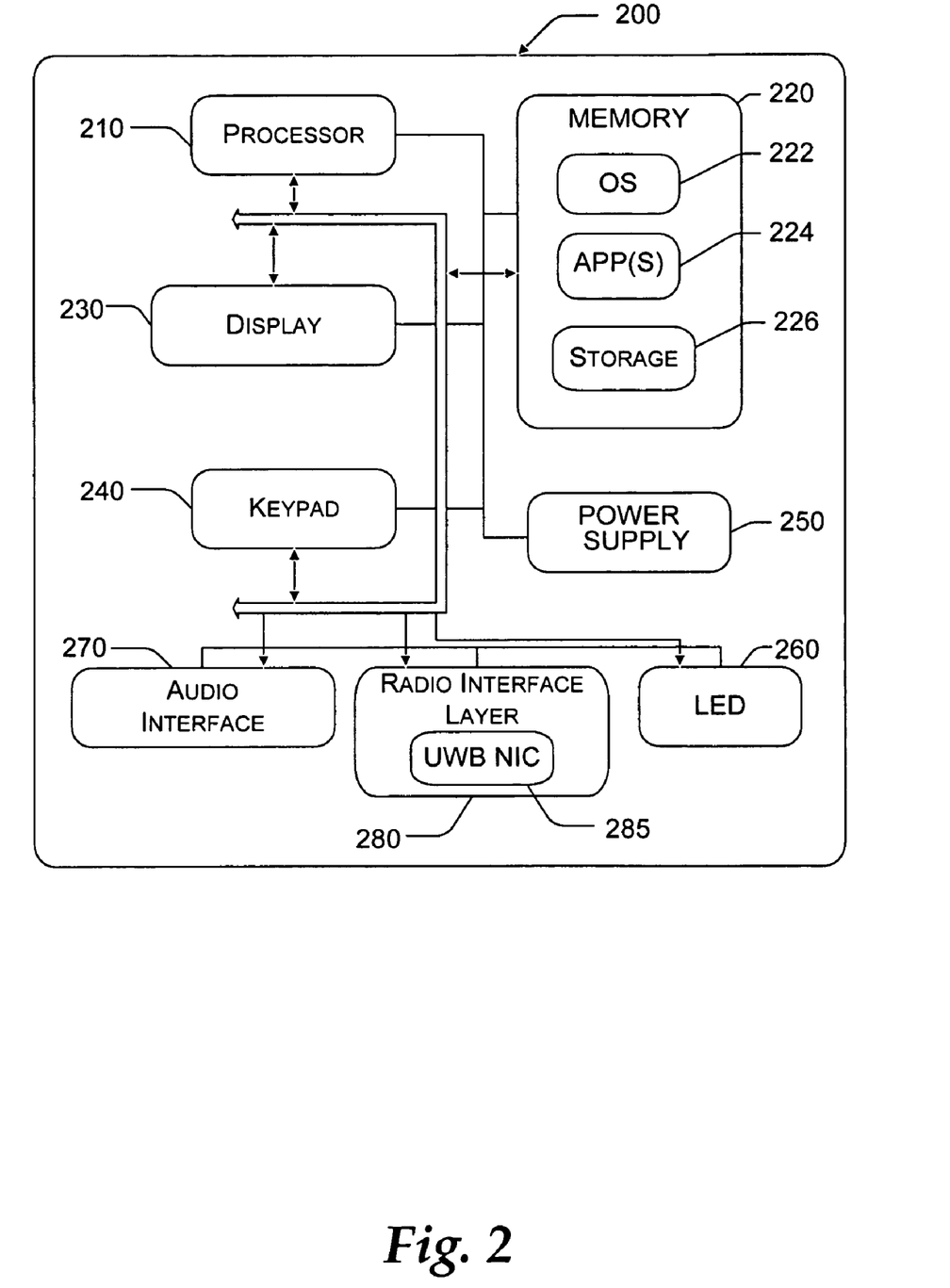
FIG. 2 is a functional diagram illustrating a mobile computing device that can operate with an ultra wideband device.

FIG. 2 is a functional diagram illustrating a mobile computing device, such as mobile computing device 200, that can operate with an ultra wideband device. The mobile computing device 200 has a processor 210, a memory 220, a display 230, and a keypad 240. The memory 220 generally includes both volatile memory (e.g., RAM) and non-volatile memory (e.g., ROM, Flash Memory, or the like). The mobile computing device 200 includes an operating system 222, such as the Windows CE® operating system from the Microsoft Corporation of Redmond, Wash. or another operating system, which is resident in the memory 220 and executes on the processor 210. The keypad 240 may be a push button numeric dialing pad (such as on a typical telephone), a multi-key keyboard (such as a conventional keyboard). The display 230 may be a liquid crystal display (LCD), or any other type of display commonly used in mobile computing devices. The display 230 may be touch-sensitive, and would then also act as an input device.

One or more application programs 224 are loaded into memory 220 and run on the operating system 222. Examples of application programs include phone dialer programs, email programs, scheduling programs, PIM (personal information management) programs, word processing programs, spreadsheet programs, Internet browser programs, and so forth. The mobile computing device 200 also includes non-volatile storage 226 within the memory 220. The non-volatile storage 226 may be used to store persistent information which should not be lost if the mobile computing device 200 is powered down. The applications 224 may use and store information in the storage 226, such as e-mail or other messages used by an e-mail application, contact information used by a PIM, appointment information used by a scheduling program, documents used by a word processing application, and the like.

The mobile computing device 200 has a power supply 250, which may be implemented as one or more batteries. The power supply 250 might further include an external power source, such as an AC adapter or a powered docking cradle that supplements or recharges the batteries.

The mobile computing device 200 is shown with two types of external notification mechanisms: an LED 260 and an audio interface 270. These devices may be directly coupled to the power supply 250 so that when activated, they remain on for a duration dictated by the notification mechanism even though the processor 210 and other components might shut down to conserve battery power. The LED 260 may be programmed to remain on indefinitely until the user takes action to indicate the powered-on status of the device. The audio interface 270 is used to provide audible signals to and receive audible signals from the user. For example, the audio interface 270 may be coupled to a speaker for providing audible output and to a microphone for receiving audible input, such as to facilitate a telephone conversation.

The mobile computing device 200 also includes a radio interface layer 280 that performs the function of transmitting and receiving communications, such as radio frequency communications. The radio interface layer 280 facilitates wireless connectivity between the mobile computing device 200 and the outside world. For example, the radio interface layer 280 includes ultra wideband network interface card 285 which enables ultra wideband wireless communication with other computing devices. Transmissions to and from the radio interface layer 280 are conducted under control of the operating system 222. In other words, communications received by the radio interface layer 280 may be disseminated to application programs 224 via the operating system 222, and vice versa.

Ultra Wideband Device

The present disclosure is described in the general context of computer-executable instructions or components, such as software modules, being executed on a computing device. Generally, software modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

Figure 3:
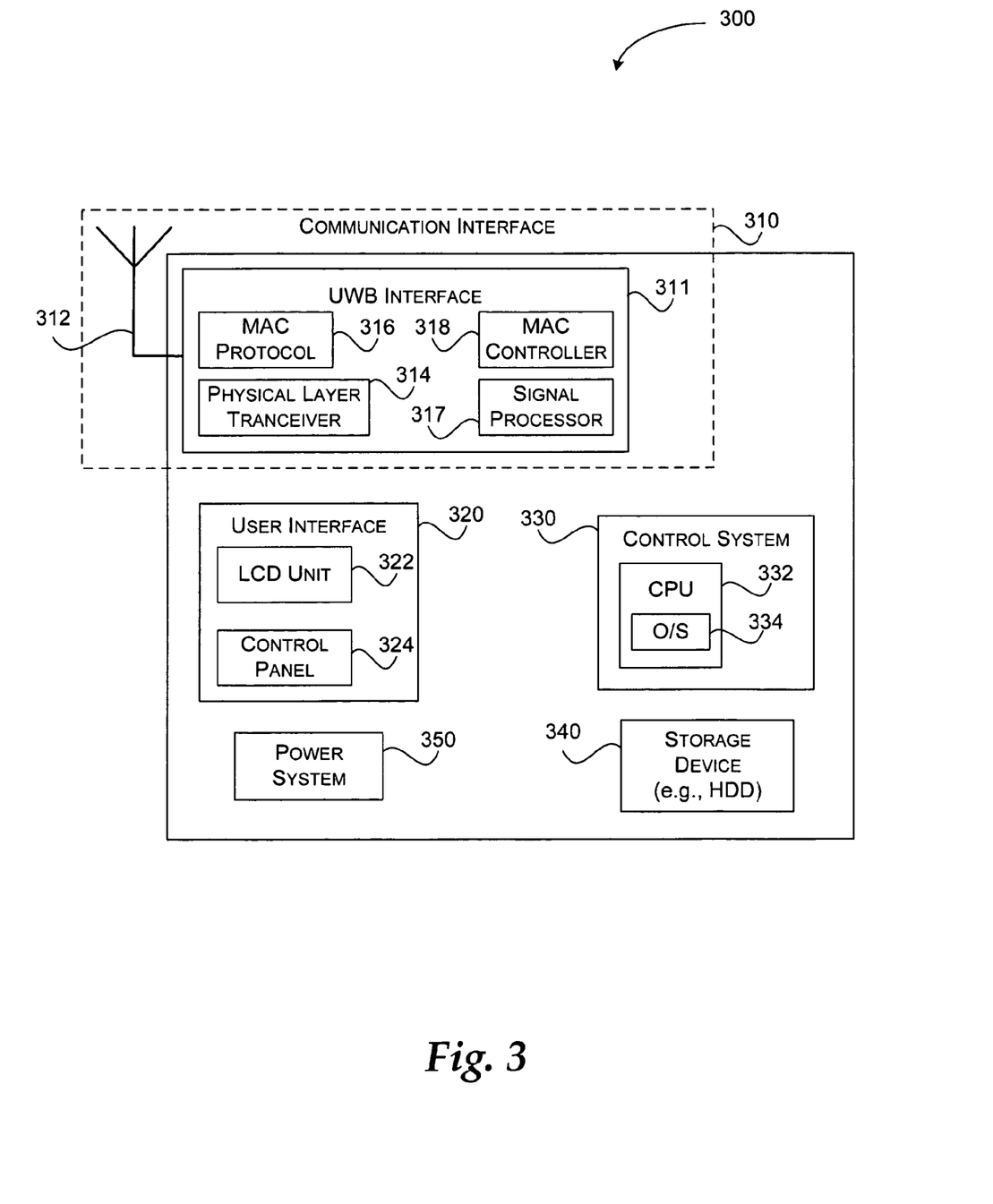
FIG. 3 is a functional block diagram illustrating example hardware components for an ultra wideband device.

FIG. 3 is a functional block diagram illustrating example hardware components for an ultra wideband device. Ultra wideband device 300 provides an exemplary portable storage device with an ultra wideband communication interface. Ultra wideband device 300 wirelessly connects to personal computers and other consumer electronic devices with an ultra-high speed link. The hardware architecture of ultra wideband device 300 includes communication interface 310, user interface 320, control system 330 optionally provided by central processing unit 332, storage device 340, and power system 350.

Communication interface 310 includes ultra wideband interface 311 that communicates with a host computer or other computing devices through antenna 312. Ultra wideband interface 311 includes physical layer transceiver 314 and a Medium Access Control (MAC) protocol 316. With the MAC protocol, ultra wideband interface 311 supports an ad hoc network for mobile wireless connectivity. Ultra wideband interface 311 further includes radio frequency baseband signal processor 317 and MAC controller 318.

User interface 320 provides information about ultra wideband device 300 to the user and receives commands from the user through liquid crystal display (LCD) unit 322 and control panel 324. User interface 320 allows a user to check the free space available on storage device 340, explore file information, and perform data management operations.

Control system 330 controls and manages ultra wideband device 300. In one embodiment, control system 330 includes a central processing unit 332 which is a 32-bit processor with embedded operating system code. In another embodiment, operating system 334 is Windows CE® which is manufactured by the Microsoft Corporation of Redmond, Wash. Central processing unit (CPU) 332 may include direct memory access channels to handle high speed data transfer between ultra wideband interface 311 and storage device 340 (e.g., a built-in hard disk). In one embodiment, flash memory in central processing unit 332 includes the operating system code, application software, and configuration data associated with ultra wideband device 300. In another embodiment, an on-board SDRAM is the main memory for central processing unit 332. In yet another embodiment, control system 330 and communication interface 310 may be integrated on one chip to achieve low cost, high data rate, low power consumption and compact size compared to a separate architecture. In still yet another embodiment, control system 330 includes an application specific integrated circuit (ASIC) with read only memory, random access memory or flash memory. The ASIC may be used in place of central processing unit 332.

Storage device 340 may be a large capacity compact hard disk drive (HDD) that operates with low power consumption. In one embodiment, a 1.8 inch or smaller embedded hard disk drive provides the necessary specifications for ultra wideband device 300. The storage capacity may be 20 GB, 40 GB, or larger.

Power system 350 is similar to common computing device power systems used with a personal digital assistant or a Smartphone®. Ultra wideband device 300 is powered by a rechargeable battery or a direct current power supply through a power adapter. In one embodiment, power system 350 provides a cross-layer power saving design to reduce power consumption.

Figure 4:
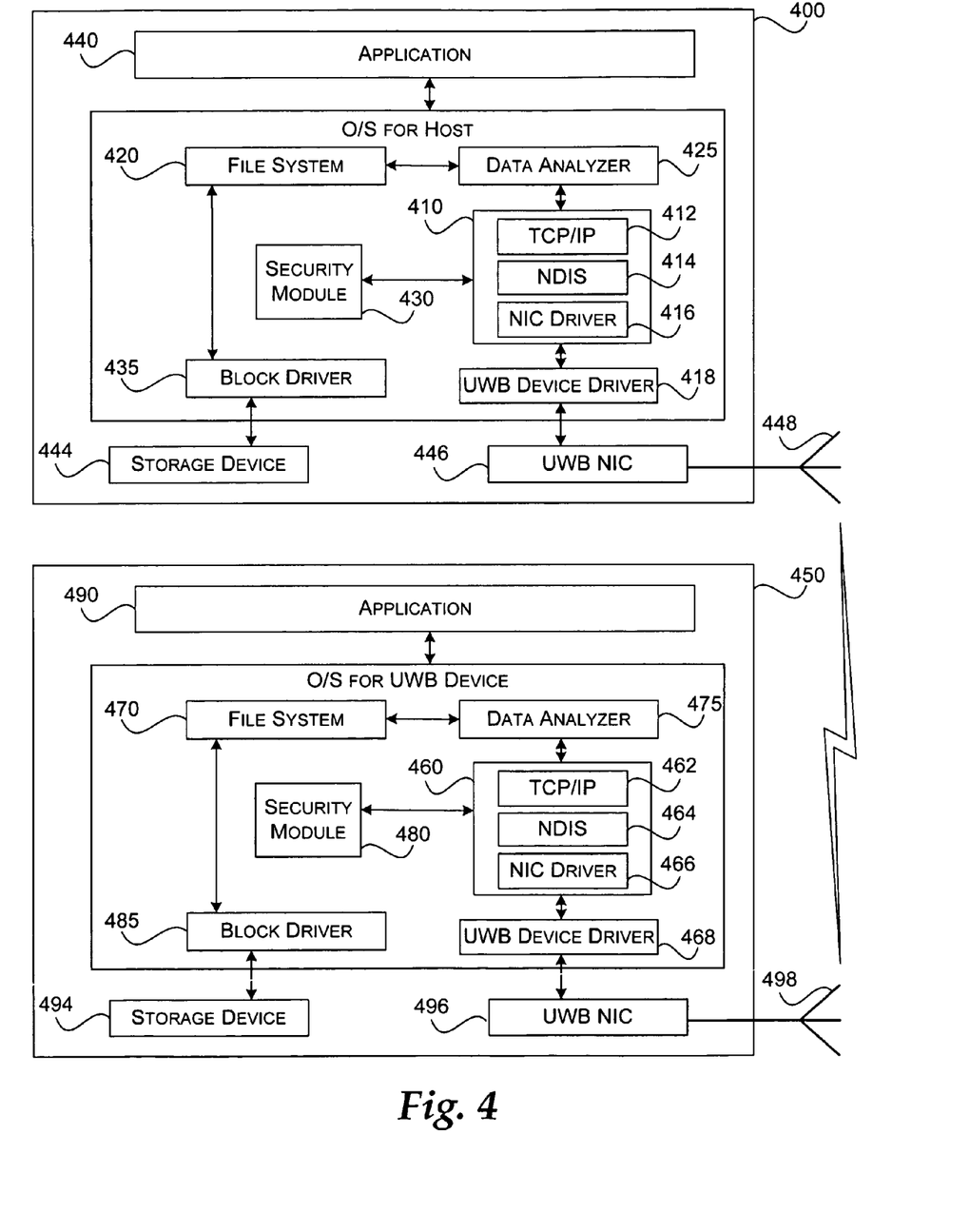
FIG. 4 is a functional block diagram illustrating example software modules for an ultra wideband device and a host computing device.

FIG. 4 is a functional block diagram illustrating example software modules for an ultra wideband device and a host computing device. Host device 400 may be any computing device such as a personal computer or a mobile computing device. In one embodiment, host device is a disaggregated computing device. The software architecture of host device 400 and ultra wideband device 450 include many of the same operating system modules. For example, both host device 400 and ultra wideband device 450 include communication module 410, 460, ultra wideband device driver 418, 468, file system 420, 470, data analyzer 425, 475, security module 430, 480, and block driver 435, 485. Host device 400 and ultra wideband device 450 further include application 440, 490, storage device 444, 494, ultra wideband network interface card 446, 496, and antenna 448, 498.

Each communication module 410, 460 includes transmission control protocol/internet protocol (TCP/IP) stack 412, 462, network driver interface specification 414, 464, and network interface card driver 416, 466. TCP/IP is a communications protocol that connects hosts on the Internet. Ultra wideband network interface card 446, 496 is an expansion card that enables host device 400 and ultra wideband device 450 to be connected to an ultra wideband communication network. Network driver interface specification 414, 464 is a device driver interface that enables ultra wideband network interface card 446, 496 to support multiple network protocols.

Network driver interface specification 414, 464 includes a protocol manager that accepts requests from network interface card driver 416, 466 and passes these requests to ultra wideband network interface card 446, 496 via ultra wideband device driver 418, 468. Network interface card driver 416, 466 directly controls ultra wideband network interface card 446, 496. Network driver interface specification 414, 464 contains encryption/decryption and compression/decompression for sending/receiving data packets.

File system 420, 470 performs logical operations on files. Block driver 435, 485 controls and manages sectors on storage device 444, 494. Data analyzer 425, 475 analyzes file system operation commands and parameters. Data analyzer 425, 475 determines whether the file operation occurs on corresponding local storage device 444, 494 or on a remote device. Data analyzer 425, 475 performs file operation command and parameter transformation for wireless file transfer to a remote computing device.

Security module 430, 480 provides authentication and user access control to a protected network. Security module 430, 480 allows host device 400 to access an authenticated ultra wideband device located nearby. However, host device 400 cannot eavesdrop on other unauthenticated ultra wideband devices. Access control allows different users to access different resources and perform different operations in ultra wideband device 450. Security module 430, 480 also provides dynamically changing encryption keys. Security module 430, 480 may be implemented above the network driver interface specification layer in communication module 410, 460.

The communication process between host device 400 and ultra wideband device 450 may be initiated by either device because both host device 400 and ultra wideband device 450 are operated by independent control systems. The communication process described below refers to file transmission from host device 400 to ultra wideband device 450. However, the file transfer may occur from ultra wideband device 450 to host device 400 and still remain within the scope of the invention as claimed.

Application 440 initiates the communication process when a file is to be transferred from host device 400 to ultra wideband device 450. Application 440 submits a file transmission request to the operating system of host device 400. The file is retrieved from storage device 444. File system 420 encrypts data associated with the file. File system 420 may scan the data for viruses and correct any errors. File system 420 may also optionally compress the file for ultra wideband transmission. File compression may be necessary if the required data transfer rate between host device 400 and ultra wideband device 450 cannot be supported. Data analyzer 425 determines where to forward the file. The file is forwarded to communication module 410 and ultra wideband device driver 418. Ultra wideband device driver 418 formats the data for transmission over ultra wideband network interface card 446. The formatted data is then forwarded to ultra wideband network interface card 446 before being sent over the wireless medium to ultra wideband device 450 through antenna 448.

Ultra wideband network interface card 496 receives a transmission request via antenna 498. The transmission request determines whether ultra wideband device 450 is authorized to receive the data from the transmitting device. Ultra wideband network interface card 496 reports the transmission request to the operating system of ultra wideband device 450. The operating system evaluates whether the request is approved for reception (e.g., handshaking authentication). If the transmission request is approved, the data is forwarded from ultra wideband network interface card 496 to communication module 460 for decompression (if necessary), decryption, error correction, integrity confirmation, and virus scanning. TCP/IP stack 462 parses the original data from the transmitted file. Data analyzer 475 translates the data into its original format which is supported by ultra wideband device 450. Data analyzer 475 then calls block driver 485 to store the data on storage device 494.

The communication process enables advanced features by implementing different modules in the application layer. For example, a universal plug-and-play feature may be implemented in the application layer. When ultra wideband device 450 is within the wireless access range of host device 400, host device 400 recognizes and establishes an ad hoc connection with ultra wideband device 450. A software module may be added in network interface card driver 416 of host device 400 for identifying the connected ultra wideband device. The software module communicates with a host device manager. When host device 400 detects a newly connected ultra wideband device, the host device manager in the operating system receives commands and parameters corresponding to the ultra wideband device. The device manager configures block driver 435 to support the newly connected ultra wideband device and notifies a storage manager. The storage manager configures a partition driver and the file system driver to support the newly connected ultra wideband device. With all the necessary drivers configured, host device 400 identifies the ultra wideband device as the local storage device from the viewpoint of upper layer applications.

An automatic synchronization feature may be enabled by implementing an auto-sync module in an application layer of communication module 410, 460. A timer may be set for a time duration (e.g., every five minutes) upon which host device 400 and ultra wideband device 450 send a command to each other requesting file updates which conform to pre-defined ultra wideband data transmission protocols. The protocols may be established at the upper layer application and may detect recent new versions or newly generated files. The auto-sync modules on host device 400 and on ultra wideband device 450 are connected as a peer-to-peer network. The module that receives the command collects the required information and transfers the appropriate file to the device that originates the command.

For example, a synchronization request may be sent from host device 400 to ultra wideband device 450. Host device 400 discovers ultra wideband device 450 via a handshaking authentication process. Ultra wideband device 450 receives an access request from host device 400, and responds that access is established when ultra wideband device 450 is authenticated. Application 440 generates the synchronization request. The synchronization request is passed to ultra wideband network interface card 446 through the operating system. Ultra wideband network interface card 446 transmits the synchronization request to ultra wideband device 450 via antenna 448. Ultra wideband device 450 receives the synchronization request from host device 400 via antenna 498. The synchronization request is received at ultra wideband network interface card 496 and passed to application 490 via the operating system. Application 490 detects the connection to host device 400. Application 490 collects synchronization data from storage device 494 via block driver 435. In one embodiment, application 490 generates a hash of the synchronization data. Files associated with the synchronization data are passed to ultra wideband network interface card 496 for transmission to host device 400 via antenna 498. The transmitted files are received at ultra wideband network interface card 446 via antenna 448. Application 440 updates/synchronizes data in storage device 444 based on the received files.

Figure 5:
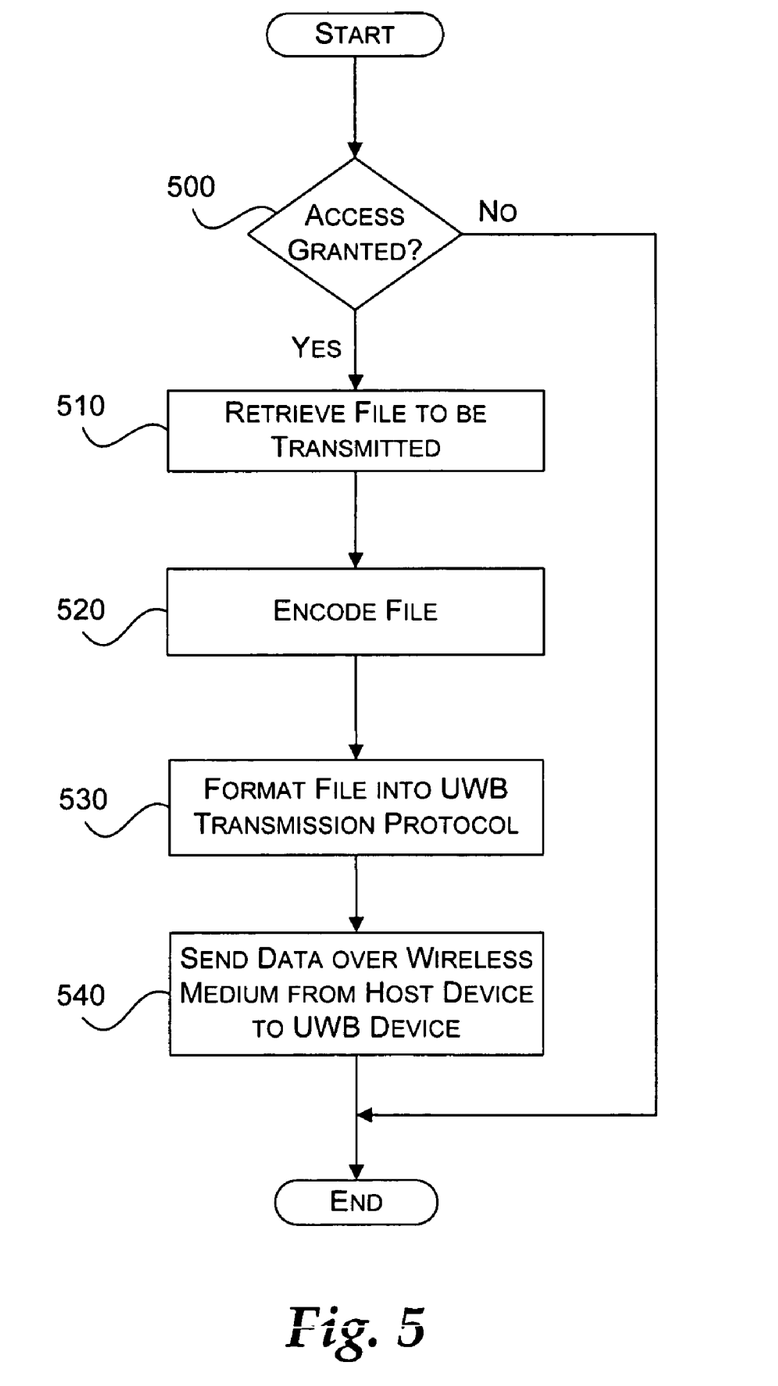
FIG. 5 is an operational flow diagram illustrating a process for transmitting data over an ultra wideband wireless connection.

FIG. 5 is an operational flow diagram illustrating a process for transmitting data over an ultra wideband wireless connection. The process begins at a start block where an application initiates transmission of a file from a transmitting device (e.g., a host device) to a receiving device (e.g., an ultra wideband device). File transmission may be initiated when the application submits a file transmission request to an operating system of the host device. In one embodiment, the file transmission request is submitted in response to a request to synchronize data with another computing device. In another embodiment, the file transmission request is submitted in response to user activation. For example, a user may submit the file transmission request to transfer files stored on the ultra wideband device to a public terminal such that the files are accessible from the public terminal.

Processing continues at decision block 500 where a security module determines whether the receiving device is authorized to access data on the transmitting device. In one embodiment, the determination is made after a handshaking process succeeds/fails. If the receiving device is granted access to data on the transmitting device processing continues at block 510. Otherwise, processing terminates at an end block. A receiving device is prevented from accessing an unauthenticated transmitting device to prevent unauthorized access to data.

Proceeding to block 510, the file to be transmitted is retrieved from the storage device of the transmitting device. The file is retrieved using a block driver which controls and manages the storage device. Moving to block 520, a network driver interface specification encodes the file. The encoding may include encryption, virus scanning, error correction, identification of the receiving device, and file compression. In one embodiment, the file is also compressed if the required data transfer rate between devices cannot be supported by ultra wideband technology. Transitioning to block 530, the file is forwarded to a TCP/IP stack for formatting into an ultra wideband data transmission protocol.

Continuing to block 540, a ultra wideband network interface card transmits the file over a wireless medium from the transmitting device to the receiving device. The ultra wideband network interface card is an expansion card that enables the transmitting device and the receiving device to be connected to an ultra wideband communication network. The ultra wideband network interface card is enabled to support multiple network protocols by a network driver interface specification. Processing then terminates at the end block.

Figure 6:
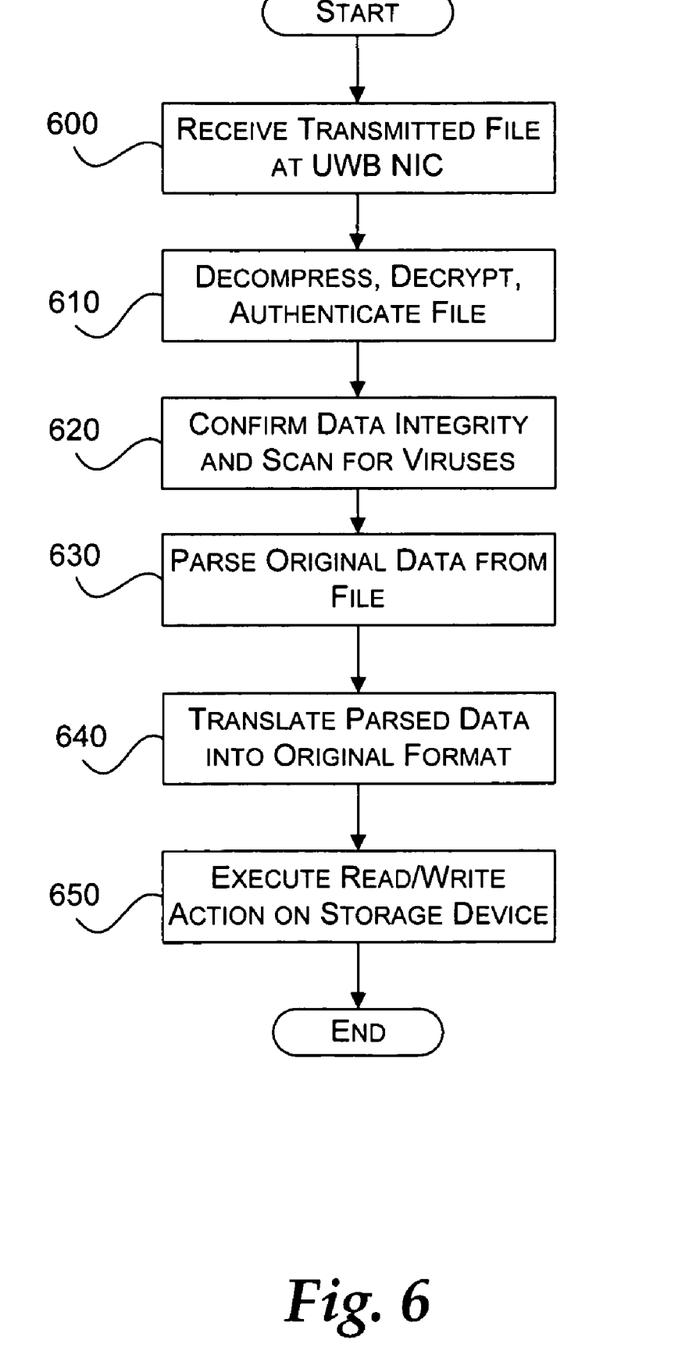
FIG. 6 is an operational flow diagram illustrating a process for receiving data over an ultra wideband wireless connection.

FIG. 6 is an operational flow diagram illustrating a process for receiving data over an ultra wideband wireless connection. The process begins at a start block where the file is transmitted from the transmitting device over a wireless connection to the receiving device, as discussed in reference to FIG. 5. At block 600, the file is received at the ultra wideband network interface card of the receiving device. The receiving device is authorized to receive data from the transmitting device. The file is then forwarded to a communication module for processing.

Moving to block 610, the communication module decrypts and authenticates the file. The communication module may also decompress the file if necessary. The communication module may further process the data by confirming data integrity and scanning the file for viruses at block 620. Any identified errors in the file may be corrected. Proceeding to block 630, the communication module parses the original data from the file using a TCP/IP stack. Advancing to block 640, the parsed data is translated into its original format which is supported by the receiving device. The translated data may correspond to a read action or a write action to be executed on a storage device of the receiving device. Continuing to block 650, the read or write action corresponding to the translated data is executed on the storage device of the receiving device. The translated data is automatically available to the receiving device without requiring any user action to access the data. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A disaggregated computing device is arranged to operate with a ultra wideband device that through an ultra wideband communication medium, wherein the disaggregated computing device is configured to operate on an application, wherein the disaggregated computing device includes different computing components that are not directly integrated with each other, the disaggregated computing device comprising:

an ultra wideband communication interface that is arranged to wirelessly interact with the ultra wideband device to transfer data wirelessly between the ultra wideband communication interface and the ultra wideband device wirelessly through the ultra wideband communication medium; wherein the communication interface is arranged to directly interact with the wideband device when the ultra wideband device is within a wireless range of the disaggregated computing device;

an operating system that is arranged to detect when the ultra wideband device is newly connected to the disaggregated computing device and in response to the connection, configuring a block driver within the operating system such that the disaggregated computing device identifies the ultra wideband device as a local storage device for applications on the disaggregated computing device;

a storage system that is arranged to provide a framework for automatic interaction between the disaggregated computing device and the ultra wideband device, the storage system comprising:

a file system that is arranged to: identify file system requests associated with the application, and receive file system operations based on the identified file system requests; wherein the file system is arranged to execute read actions and write actions in response to ultra wideband communications, a data analyzer that is arranged to: translate data between a first data format that is supported by the file system and a second data format that is supported by an ultra wideband device that is within a wireless range of the disaggregated computing device, and identify an operation corresponding to at least one of: a read action and a write action on the ultra wideband device based on the received file system operations, and a communication module that is arranged to facilitate communications between the data analyzer and the ultra wideband communication interface, wherein the ultra wideband communication interface operates on data in the second data format to facilitate communication over the wireless range to the disaggregated computing device; and wherein the communication module comprises a protocol stack driver that is arranged to enable the transfer of data between the ultra wideband communication interface and the ultra wideband device via an ultra wideband network communication protocol.

2. The disaggregated computing device of claim 1, further comprising:

a storage device; and a block driver that is arranged to: operate on the storage device and cooperate with the file system, wherein the data analyzer is further arranged to initiate execution of the identified operation on the storage device.

3. The disaggregated computing device of claim 1, wherein the data analyzer is further arranged to translate operation requests from the ultra wideband device into the second data format.

4. The disaggregated computing device of claim 1, wherein the communication module comprises a security module that is arranged to determine whether the disaggregated computing device is authorized to communicate with the ultra wideband device.

5. The disaggregated computing device of claim 1, wherein the communication module comprises a security module that is arranged to restrict the amount of data that is transferred between the disaggregated computing device and the ultra wideband device.

6. The disaggregated computing device of claim 1, wherein the communication module comprises an ultra wideband driver that is arranged to control the transfer of data between the ultra wideband communication interface and the ultra wideband device.

7. The disaggregated computing device of claim 1, wherein the data is transferred between the ultra wideband communication interface and the ultra wideband device at a data rate greater than 100 megabits per second.

8. The disaggregated computing device of claim 1, wherein the ultra wideband communication interface is further arranged to synchronize data between the disaggregated computing device and the ultra wideband device.

9. An ultra wideband device that is arranged to operate with a disaggregated computing device through an ultra wideband communication medium, the ultra wideband device comprising:

a storage device;

an ultra wideband communication interface that is arranged to interact with the disaggregated computing device to transfer data between the ultra wideband communication interface and the disaggregated computing device through the ultra wideband communication medium; wherein the ultra wideband communication interface is arranged to interact with the disaggregated computing device; wherein the disaggregated computing device that is arranged to detect when the ultra wideband device is newly connected to the disaggregated computing device and in response to the connection, configuring a block driver within the operating system such that the disaggregated computing device identifies the ultra wideband device as a local storage device for applications on the disaggregated computing device; and a storage system that is arranged to provide a framework for automatic interaction between the disaggregated computing device and the storage device, the storage system comprising:

a block driver that is arranged to operate on the storage device, a file system that is arranged to cooperate with the block driver, a data analyzer that is arranged to interact with the file system to: translate data between a first data format that is supported by the storage device and a second data format, identify an operation corresponding to at least one of: a read action and a write action on the storage device based on the translated data, and initiate execution of the identified operation on the storage device, and a communication module that is arranged to facilitate communications between the data analyzer and the ultra wideband communication interface, wherein the ultra wideband communication interface operates on data in the second data format; wherein the communication module comprises a protocol stack driver that is arranged to enable the transfer of data between the ultra wideband communication interface and the disaggregated computing device via an ultra wideband network communication protocol.

10. The ultra wideband device of claim 9, wherein the data analyzer is further arranged to translate operation requests from the disaggregated computing device into the second data format.

11. The ultra wideband device of claim 9, wherein the communication module comprises a security module that is arranged to determine whether the ultra wideband device is authorized to communicate with the disaggregated computing device.

12. The ultra wideband device of claim 9, wherein the communication module comprises a security module that is arranged to restrict the amount of data that is transferred between the ultra wideband device and the disaggregated computing device.

13. The ultra wideband device of claim 9, wherein the communication module comprises an ultra wideband driver that is arranged to control the transfer of data between the ultra wideband communication interface and the disaggregated computing device.

14. The ultra wideband device of claim 9, wherein the data is transferred between the ultra wideband communication interface and the disaggregated computing device at a data rate greater than 100 megabits per second.

15. A method for wirelessly communicating between an ultra wideband device and a disaggregated computing device through an ultra wideband communication medium, the method comprising:
    determining when the ultra wideband device is newly connected to the disaggregated computing device and in response to the connection, identifying the ultra wideband device as a local storage device for applications on the disaggregated computing device;
    receiving an ultra wideband communication transmission with a selected device, wherein the selected device corresponds to one of the disaggregated computing device and the ultra-wideband device; and wherein the disaggregated computing device and the ultra wideband device are within a wireless range of the ultra wideband communication transmission;
    authenticating the ultra wideband communication transmission to automatically determine if the ultra wideband communication transmission is permitted between the ultra wideband device and the disaggregated computing device;
    extracting information from the received ultra wideband communication transmission when permission between the ultra wideband device and the disaggregated computing device is granted;
    identifying operations for the selected device from the extracted information;
    formatting data from the extracted information for the identified operation; and
    communicating the identified operation and the formatted data to a file system on the selected device, such that the wireless communication between the ultra wideband device and the disaggregated computing device is transparent to the disaggregated computing device; wherein the communicating utilizes a protocol stack driver that is arranged to enable the transfer of data between an ultra wideband communication interface and the disaggregated computing device via an ultra wideband network communication protocol.

16. The system of claim 15, wherein extracting information from the received ultra wideband communication comprises at least one of: decrypting data associated with the received ultra wideband communication, decompressing data associated with the received ultra wideband communication, virus-scanning data associated with the received ultra wideband communication, error checking data associated with the received ultra wideband communication, and confirming the integrity of data associated with the received ultra wideband communication.

17. A method for wirelessly communicating between an ultra wideband device and a disaggregated computing device through an ultra wideband communication medium, the method comprising:
    determining when the ultra wideband device is newly connected to the disaggregated computing device and in response to the connection, identifying the ultra wideband device as a local storage device for applications on the disaggregated computing device;
    selecting a device from one of the disaggregated computing device and the ultra wideband device;
    identifying a file system operation for the selected device with the non-selected one of the disaggregated computing device and the ultra wideband device;
    retrieving data associated with the identified file system operation;
    formatting information from the retrieved data and the identified file system operation for an ultra wideband communication;
    encoding the ultra wideband communication with the formatted information for receipt by the selected device;
    transmitting the encoded ultra wideband communication from the non-selected device to the selected device such that the wireless communication between the ultra wideband device and the disaggregated computing device is transparent to the disaggregated computing device;
    wherein the communication utilizes a protocol stack driver that is arranged to enable the transfer of data between an ultra wideband communication interface and the disaggregated computing device via an ultra wideband network communication protocol.

18. The system of claim 17, wherein encoding information comprises at least one of: encrypting the formatted information, compressing the formatted information, virus- scanning the formatted information, error correction coding the formatted information, and identifying the selected device in the ultra wideband communication.

* * * * *